(12) United States Patent
Honma et al.

(10) Patent No.: US 10,135,068 B2
(45) Date of Patent: Nov. 20, 2018

(54) CATHODE ACTIVE MATERIAL FOR SODIUM SECONDARY BATTERY AND METHOD FOR MANUFACTURING THE CATHODE ACTIVE MATERIAL FOR SODIUM SECONDARY BATTERY

(71) Applicant: Nippon Electric Glass Co., Ltd., Shiga (JP)

(72) Inventors: Tsuyoshi Honma, Niigata (JP); Takayuki Komatsu, Niigata (JP); Junichi Ikejiri, Shiga (JP); Hideo Yamauchi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 585 days.

(21) Appl. No.: 14/383,646

(22) PCT Filed: Mar. 7, 2013

(86) PCT No.: PCT/JP2013/056272
§ 371 (c)(1),
(2) Date: Sep. 8, 2014

(87) PCT Pub. No.: WO2013/133369
PCT Pub. Date: Sep. 12, 2013

(65) Prior Publication Data
US 2015/0303470 A1 Oct. 22, 2015

(30) Foreign Application Priority Data

Mar. 9, 2012 (JP) .................................. 2012-052445
Apr. 24, 2012 (JP) .................................. 2012-098474

(51) Int. Cl.
*H01M 4/58* (2010.01)
*C01B 25/45* (2006.01)
(Continued)

(52) U.S. Cl.
CPC ........... *H01M 4/5825* (2013.01); *C01B 25/42* (2013.01); *C01B 25/45* (2013.01);
(Continued)

(58) Field of Classification Search
CPC .. H01M 4/5825; H01M 4/366; H01M 10/054; H01M 4/625; C01B 25/45
See application file for complete search history.

(56) References Cited

U.S. PATENT DOCUMENTS

2002/0192152 A1   12/2002   Funabiki et al.
2004/0206938 A1*  10/2004   Barker ............... H01M 4/5825
                                                        252/500
(Continued)

FOREIGN PATENT DOCUMENTS

CN       1366719    8/2002
CN     101964420    2/2011
(Continued)

OTHER PUBLICATIONS

Beaury, "The blue allotropic form of Co2+:Na2CoP2O7: optical and magnetic properties, correlation with crystallographic data" Journal of Solid State Chemistry 177 (2004) 1437-1443.*

(Continued)

*Primary Examiner* — Devina Pillay
(74) *Attorney, Agent, or Firm* — Wenderoth, Lind & Ponack, L.L.P.

(57) ABSTRACT

Provided are a cathode active material for a sodium ion secondary battery that is excellent in alkali ion diffusivity, structural stability, and cycle performance, and a synthesis method therefor. The cathode active material for a sodium ion secondary battery includes a melt-solidified body or oxide glass represented by the general formula $Na_xM_yP_2O_7$ (where M represents at least one or more kinds of transition metal elements selected from Cr, Fe, Mn, Co, and Ni, x (Continued)

satisfies a relationship of $1.20 \leq x \leq 2.10$, and y satisfies a relationship of $0.95 \leq y \leq 1.60$).

14 Claims, 4 Drawing Sheets

(51) Int. Cl.
  *C01B 25/42* (2006.01)
  *H01M 10/054* (2010.01)
  *H01M 4/36* (2006.01)
  *H01M 4/62* (2006.01)

(52) U.S. Cl.
  CPC ......... *C01P 2006/40* (2013.01); *H01M 4/366* (2013.01); *H01M 4/625* (2013.01); *H01M 10/054* (2013.01); *H01M 2220/10* (2013.01)

(56) References Cited

U.S. PATENT DOCUMENTS

| | | | |
|---|---|---|---|
| 2005/0136331 A1* | 6/2005 | Jouanneau-Si Larbi | H01M 4/131 429/231.95 |
| 2006/0091363 A1 | 5/2006 | Barker et al. | |
| 2009/0305132 A1* | 12/2009 | Gauthier | H01M 4/04 429/207 |
| 2010/0081058 A1* | 4/2010 | Sano | C01B 25/37 429/231.5 |
| 2011/0020708 A1 | 1/2011 | Fujiki et al. | |
| 2011/0086266 A1* | 4/2011 | Kondo | H01M 4/5825 429/206 |
| 2012/0015256 A1 | 1/2012 | Komaba et al. | |
| 2012/0021273 A1 | 1/2012 | Ohmori et al. | |
| 2013/0146808 A1* | 6/2013 | Endo | H01M 4/505 252/182.1 |

FOREIGN PATENT DOCUMENTS

| | | | |
|---|---|---|---|
| JP | 2006-523930 | 10/2006 | |
| JP | 2008-130525 | 6/2008 | |
| JP | 2008-260666 | 10/2008 | |
| JP | 2009-087933 | 4/2009 | |
| JP | 2010-225525 | 10/2010 | |
| JP | 2011-001242 | 1/2011 | |
| JP | WO2011021686 A1 * | 2/2011 | ............ C01G 53/50 |
| TW | 201526365 | 7/2015 | |
| WO | 2010/109889 | 9/2010 | |

OTHER PUBLICATIONS

Dutch "Triclinic and Monoclinic (2 and m) Space Groups", Mar. 2009, https://www.uwgb.edu/dutchs/SYMMETRY/3dSpaceGrps/3DSPGR001-009.HTM.*
Japanese Office Action dated Sep. 13, 2016 in corresponding Japanese Patent Application No. 2014-503540 (with English translation).
International Preliminary Report on Patentability dated Sep. 9, 2014 in International (PCT) Application No. PCT/JP2013/056272.
International Search Report dated Jun. 4, 2013 in International (PCT) Application No. PCT/JP2013/056272.
Fukunaga et al., "Sodium Secondary Batteries Using Binary Molten (Na,K)FSA", In the 62$^{nd}$ Annual Meeting of the International Society of Electrochemistry, abs., 2011.
Komaba et al., "Electrochemically Reversible Sodium Intercalation of Layered NaNi0.5Mn0.5O2 and NaCrO2", ECS Transactions, 2009, vol. 16, Issue 42, pp. 43-55.
Taiwanese Office Action dated May 10, 2016 in corresponding Taiwanese Patent Application No. 102108182, with partial English translation.

* cited by examiner

CATHODE ACTIVE MATERIAL FOR SODIUM SECONDARY BATTERY AND METHOD FOR MANUFACTURING THE CATHODE ACTIVE MATERIAL FOR SODIUM SECONDARY BATTERY

TECHNICAL FIELD

The present invention relates to a cathode active material for a sodium ion secondary battery and a manufacturing method therefor. More particularly, the present invention relates to a cathode active material for a sodium ion secondary battery, comprising a composite oxide formed of sodium, iron oxide, and phosphate and a manufacturing method therefor.

BACKGROUND ART

In recent years, a demand for a secondary battery has spread not only to a market for mobile electronic devices but also to markets for large transporters such as electric vehicles and plug-in hybrid vehicles, emergency storage batteries for home use, and the like. While a lithium ion secondary battery is generally considered to be promising for these applications, a sodium-sulfur battery (commonly referred to as NAS battery) is being introduced in power generation plants or factories as a power storage unit requiring high-power by virtue of advantages in raw material cost and running cost.

The NAS battery is operated at high temperature (from about 300 to 350° C.) in order to keep sodium and sulfur serving as active materials in molten states and enhance ion conductivity of a β-alumina electrolyte. The molten sodium at an anode is oxidized to Na$^+$ at an interface with β-alumina and moves to a cathode through the electrolyte. On the other hand, at the cathode, Na$^+$ is reduced to sodium pentasulfide (Na$_2$S$_5$) by sulfur. The cell reactions described above (discharge reaction) can be represented by the following formulae. Herein, the upper formula (1) represents the reaction at the anode, the middle formula (2) represents the reaction at the cathode, and the lower formula (3) represents the whole reaction.

$$2Na \rightarrow 2Na^+ + 2e^- \quad (1)$$

$$5S + 2Na^+ + 2e^- \rightarrow Na_2S_5 \quad (2)$$

$$2Na + 5S \rightarrow Na_2S_5 \quad (3)$$

The NAS battery is compact because of having a volume and weight about one-third of those of an existing lead storage battery. Therefore, the NAS battery can exhibit the same function as that of power generation with pumped-up water and can be placed near a place of demand such as an urban area. In addition, it is possible to combine the NAS battery with wind power generation or solar power generation having large output power variation to stabilize the output power. Moreover, it is possible to place the NAS battery in commercial-scale utility consumers such as plants or factories and charge the battery by utilizing cheaper night-time power, and at the same time, use the battery as an emergency power source in case of power outage. Further, the NAS battery has various advantages in that constituent materials are abundant and long-life resources, self-discharge is small, charge and discharge efficiency is high, the cost is expected to be reduced by mass production, and the like.

However, the NAS battery does not operate at normal temperature, and hence, there is a need to maintain the temperature in an operating temperature range (about 300° C.) by heating with a heater and using heat generated through discharge. Concerning the charge and discharge performance, the hour rate is set relatively longer (6 to 7 hours). In addition, there is a need for full charge reset within a certain period of time at present. Further, one problem that is difficult to solve practically is that when a fire accident is caused, aqueous fire-extinguishing chemicals generally used cannot be used because they react with metal sodium. Therefore, it is difficult for general fire departments to immediately respond to the fire and the applications and scale of cell capacity to be placed are significantly limited in the current situation.

In this connection, heretofore, a sodium ion secondary battery having more excellent safety has been proposed. In general, there is proposed a material prepared by replacing with sodium a lithium site of a material used for a lithium ion battery. Sodium has an ionic radius 30% larger than and a weight heavier than those of a lithium ion, and hence diffusion in the material is reduced as compared to the lithium ion. Therefore, the cathode, anode, and electrolyte are required to have a large free space that can be occupied by the alkali ion. For a cathode active material, several candidate materials have been found as disclosed in Non Patent Literatures 1 and 2 and Patent Literatures 1 and 2.

However, for example, NaCrO$_2$ or the like disclosed in Non Patent Literature 1 has a layered rock salt structure and therefore is liable to deteriorate like lithium cobaltate, which offers a problem in structural stability.

Moreover, NaFePO$_4$ disclosed in Patent Literature 1, which has the same composition as a phosphate material, LiFePO$_4$, has not an olivine structure but of a maricite structure. Therefore, diffusion of the alkali ion is small (that is, the sodium ion is hard to move) and there are problems in structural stability and cycle performance practically.

Further, while Na$_{2/3}$Fe$_{1/3}$Mn$_{2/3}$O$_2$ disclosed in Patent Literature 2 and Non Patent Literature 2 is one having improved cycle performance by modifying the composition ratio of NaCrO$_2$, there is a problem in structural stability, because of having a layered rock salt structure as with the substance disclosed in Patent Literature 1 described above.

CITATION LIST

Patent Literature

Patent Literature 1: JP 2008-260666 A
Patent Literature 2: WO 2010/109889 A1

Non Patent Literature

Non Patent Literature 1: A. Fukunaga, T. Nohira, R. Hagiwara, S. Sakai, K. Nitta, and S. Inazawa, In The 62nd Annual Meeting of the International Society of Electrochemistry, Abs. Niigata, Japan (2011).
Non Patent Literature 2: S. Komaba et al., ECS Transaction, 16 (42), 43-55 (2009).

SUMMARY OF INVENTION

Technical Problem

The present invention has been made in view of the circumstances described above, and an object of the present invention is to provide a cathode active material for a sodium ion secondary battery that is excellent in alkali ion diffusivity, structural stability, and cycle performance, and a manufacturing method therefor.

Solution to Problem

As a result of diligent studies, the inventors of the present invention have found a composite oxide formed of sodium, a transition metal, and phosphate and having a crystal structure other than the maricite structure for which the problems described above have been pointed out. The inventors have also found that the above-mentioned object can be achieved by using the composite oxide as a cathode active material. Thus, the finding is proposed as the present invention.

That is, the present invention comprises at least the following features and configurations.

(Aspect 1)

A cathode active material for a sodium ion secondary battery, comprising a melt-solidified body represented by the general formula $Na_xM_yP_2O_7$, where M represents at least one or more kinds of transition metal elements selected from Cr, Fe, Mn, Co, and Ni, x satisfies a relationship of $1.20 \leq x \leq 2.10$, and y satisfies a relationship of $0.95 \leq y \leq 1.60$.

(Aspect 2)

A cathode active material for a sodium ion secondary battery, comprising an oxide glass having a composition of the general formula $Na_xM_yP_2O_7$, where M represents at least one or more kinds of transition metal elements selected from Cr, Fe, Mn, Co, and Ni, x satisfies a relationship of $1.20 \leq x \leq 2.10$, and y satisfies a relationship of $0.95 \leq y \leq 1.60$.

(Aspect 3)

The cathode active material for a sodium ion secondary battery according to Aspect 1 or 2, in which the transition metal element M comprises Fe.

(Aspect 4)

The cathode active material for a sodium ion secondary battery according to any one of Aspects 1 to 3, in which the cathode active material forms a crystal structure belonging to any one of triclinic space groups P1 and P1-.

(Aspect 5)

The cathode active material for a sodium ion secondary battery according to any one of Aspects 1 to 4, further comprising electro conductive carbon for coating a surface thereof, the carbon for coating having a thickness of from 1 nm to 100 nm.

(Aspect 6)

The cathode active material for a sodium ion secondary battery according to any one of Aspects 1 to 5, in which the cathode active material is formed of powder having an average grain size of from 0.7 to 5 μm.

(Aspect 7)

A method of manufacturing a cathode active material for a sodium ion secondary battery comprising a melt-solidified body represented by the general formula $Na_xM_yP_2O_7$, where M represents at least one or more kinds of transition metal elements selected from Cr, Fe, Mn, Co, and Ni, x satisfies a relationship of $1.20 \leq x \leq 2.10$, and y satisfies a relationship of $0.95 \leq y \leq 1.60$, the method comprising the steps of:
blending raw material powders,
melting the raw material powders; and
cooling the melt to obtain the melt-solidified body,
wherein the raw material powders comprising:
at least one kind of sodium raw material selected from $Na_2O$, $Na_2CO_3$, $NaHCO_3$, and NaOH and at least one kind of phosphate raw material selected from $P_2O_5$, $H_3PO_4$, and $NH_4H_2PO_4$, or a composite oxide of the sodium raw material and the phosphate raw material; and
a raw material comprising a transition metal compound comprising the transition metal element M,
the step of melting the raw material powders comprising melting the raw material powders at a temperature equal to or higher than a temperature at which the transition metal compound forms a liquid phase.

(Aspect 8)

The method of manufacturing a cathode active material for a sodium ion secondary battery according to Aspect 7, in which the transition metal element M comprises Fe.

(Aspect 9)

The method of manufacturing a cathode active material for a sodium ion secondary battery according to Aspect 8, in which an atmosphere in the step of melting the raw material powders comprises a reducing atmosphere or an inert atmosphere.

(Aspect 10)

A method of manufacturing a cathode active material for a sodium ion secondary battery comprising an oxide glass represented by the general formula $Na_xM_yP_2O_7$, where M represents at least one or more kinds of transition metal elements selected from Cr, Fe, Mn, Co, and Ni, x satisfies a relationship of $1.20 \leq x \leq 2.10$, and y satisfies a relationship of $0.95 \leq y \leq 1.60$, the method comprising the steps of:
blending raw material powders,
melting the raw material powders; and
quenching the melt to obtain the oxide glass,
wherein the raw material powders comprising:
at least one kind of sodium raw material selected from $Na_2O$, $Na_2CO_3$, $NaHCO_3$, and NaOH and at least one kind of phosphate raw material selected from $P_2O_5$, $H_3PO_4$, and $NH_4H_2PO_4$, or a composite oxide of the sodium raw material and the phosphate raw material; and
a raw material comprising a transition metal compound comprising the transition metal element M,
the step of melting the raw material powders comprising melting the raw material powders at a temperature equal to or higher than a temperature at which the transition metal compound forms a liquid phase.

(Aspect 11)

The method of manufacturing a cathode active material for a sodium ion secondary battery according to any one of Aspects 7 to 10, further comprising a pulverization step of pulverizing the melt-solidified body or the oxide glass to obtain powder.

(Aspect 12)

The method of manufacturing a cathode active material for a sodium ion secondary battery according to Aspect 11, further comprising a crystallization step of crystallizing the powder through heat treatment in an inert atmosphere or a reducing atmosphere.

(Aspect 13)

The method of manufacturing a cathode active material for a sodium ion secondary battery according to Aspect 11, the method further comprising:
an addition step of adding a carbon source to the powder; and
a crystallization step of crystallizing the powder to which the carbon source is added through heat treatment in an inert atmosphere or a reducing atmosphere.

(Aspect 14)

The method of manufacturing a cathode active material for a sodium ion secondary battery according to Aspect 13, in which the addition step comprises adding the carbon source in an amount of from 1 to 20 parts by mass.
(Aspect 15)

The method of manufacturing a cathode active material for a sodium ion secondary battery according to any one of Aspects 12 to 14, in which a crystal obtained in the crystallization step forms a crystal structure belonging to any one of triclinic space groups P1 and P1–.

Advantageous Effects of Invention

According to one embodiment of the present invention, the cathode active material for a sodium ion secondary battery that is excellent in alkali ion diffusivity, structural stability, and cycle performance, and the manufacturing method therefor can be provided. In addition, sodium, a transition metal, and phosphate are used as constituent components of the cathode active material of the present invention, and hence a cathode active material for a sodium ion secondary battery that is inexpensive and has excellent thermal stability, and a manufacturing method therefor can be provided.

DESCRIPTION OF EMBODIMENTS

Figure 1:
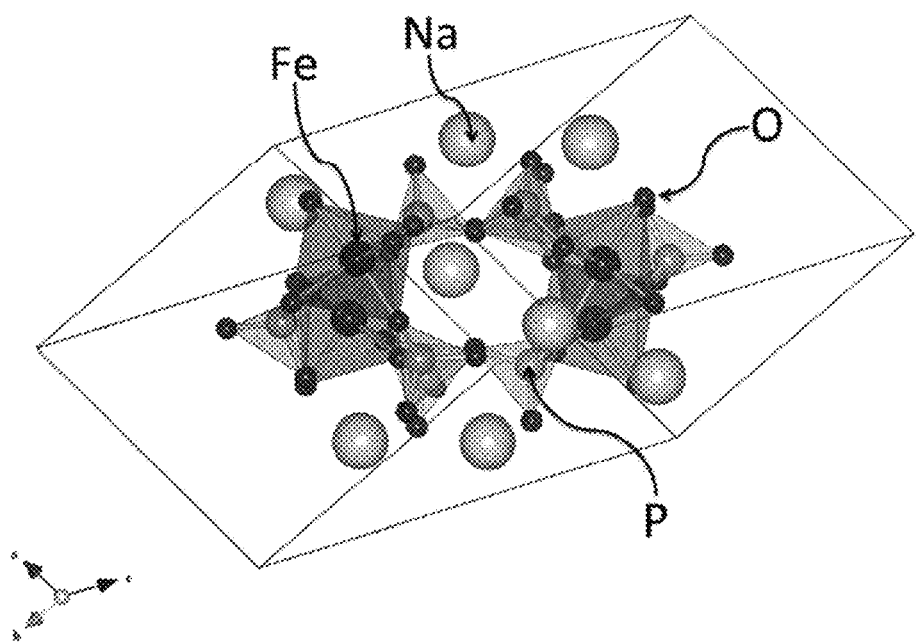
FIG. 1 is a diagram illustrating a crystal structure of a cathode active material belonging to a space group P1 according to the present invention.

A cathode active material for a sodium ion secondary battery according to a first embodiment of the present invention comprises a melt-solidified body having a composition of the general formula $Na_xM_yP_2O_7$ (where M represents at least one or more kinds of transition metal elements selected from Cr, Fe, Mn, Co, and Ni, x satisfies a relationship of $1.20 \leq x \leq 2.10$, and y satisfies a relationship of $0.95 \leq y \leq 1.60$).

Herein, the melt-solidified body refers to a solid substance obtained by cooling a homogeneous melt formed by melting a mixture of raw materials described later at a liquidus temperature or more. The melt-solidified body is formed of any one of a crystalline substance and an amorphous substance, or a complex of these substances. In the present invention, by melting the raw materials in such a manner, it is possible to easily obtain a substance having homogeneous composition distribution as compared to those obtained by general solid state reactions.

It should be noted that the liquidus temperature (also referred to as liquid phase forming temperature in this description) means a temperature at which a liquid phase is formed in a raw material compound comprising a transition metal among raw material compounds to be mixed. The liquidus temperature quantitatively falls within a temperature range lower than the melting temperature of the raw material compound and is a temperature at which the raw material compound eutectically melts. For example, in the case of using $Fe_2O_3$ as the raw material compound, the liquid phase forming temperature is 950° C. or more and less than 1,570° C., preferably from 950° C. to 1,200° C., because its melting temperature is 1,570° C. When the raw material compound is in a state of a liquid phase, a homogeneous melt can be formed in a short time (for example, several minutes to several tens of minutes). It should be noted that the raw material mixture may be melted at the liquid phase forming temperature or more, but melting of the raw material mixture at a temperature much higher than the melting temperature of the raw material compound is not preferred, because the melt vaporizes markedly, the manufacturing cost rises, and safety in the manufacturing is impaired.

Moreover, the cooling method for the melt is not particularly limited, but simple methods such as natural cooling, putting into water, spraying cooling water, and the like are preferred in view of the manufacturing cost.

Further, the raw materials to be used in the present invention may be any combination of compounds as long as constituent elements of the object material (that is, the melt-solidified body having the composition described above) are included.

As a sodium source, there may be used, for example, at least one kind of sodium raw material selected from $Na_2O$, $Na_2CO_3$, $NaHCO_3$, and $NaOH$. Meanwhile, as a phosphate source, there may be used, for example, at least one kind of phosphate raw material selected from $P_2O_6$, $H_3PO_4$, and $NH_4H_2PO_4$. Alternatively, in the present invention, a composite oxide of sodium and phosphate, $(NaPO_3)_n$, may be used instead of the sodium raw material and the phosphate raw material or in combination with these raw materials.

In the present invention, the cathode active material for a sodium ion secondary battery having the composition described above can be manufactured through heat treatment of the raw material mixture comprising the sodium source and the phosphorus source, and further, at least one kind of transition metal compound selected from a chrome source raw material, an iron source raw material, a manganese source raw material, a cobalt source raw material, and a nickel source raw material described below.

That is, as a chromium source, there may be used, for example, a chromium raw material of chromium oxide (such as $Cr_2O_3$). In addition, as an iron source, there may be used, for example, a raw material of an iron oxide (at least one kind selected from $FeO$, $Fe_3O_4$, and $Fe_2O_3$), iron (II) phosphate ($Fe_3(PO_4)_2 \cdot 5H_2O$), iron sulfate ($FeSO_4$, $FeSO_4 \cdot 2H_2O$, or $FeSO_4 \cdot 7H_2O$), ferrous chloride ($FeCl_2$ or $FeCl_2 \cdot 4H_2O$), iron sulfamate ($Fe(NH_2SO_3)_2$), iron gluconate ($C_{12}H_{22}O_{14}Fe$, $C_{12}H_{22}O_{14}Fe \cdot 2H_2O$, or $C_{12}H_{22}O_{14}Fe \cdot nH_2O$), iron fumarate ($FeC_4H_2O_4$), iron lactate ($Fe(CH_3CHOHCOO)_2 \cdot 3H_2O$), iron oxalate ($FeC_2O_4 \cdot 2H_2O$), ammonium hexacyanoferrate (II) (($NH_4)_4Fe(CN)_6 \cdot nH_2O$), sodium hexacyanoferrate (II) decahydrate ($Na_4[Fe(CN)_6] \cdot 10H_2O$), iron (II) hydroxide ($Fe(OH)_2$), iron nitrate $Fe(NO_3)_3$, or iron phosphate FePO$_4$. In addition, as a manganese source, there may be used, for example, a raw material of manganese oxide (at least one kind selected from MnO$_2$, Mn$_3$O$_4$, and MnO). In addition, as a cobalt source, there may be used, for example, a raw material of cobalt oxide (at least one kind selected from Co$_3$O$_4$, CoO, and Co$_2$O$_3$). In addition, as a nickel source, there may be used, for example, a raw material of nickel oxide (at least one kind selected from NiO and Ni$_2$O$_3$).

Further, in the present invention, it should be noted that the elements described above are combined to form the general formula Na$_x$M$_y$P$_2$O$_7$ (where M represents at least one or more kinds of transition metal elements selected from Cr, Fe, Mn, Co, and Ni) and ranges of x and y are set to $1.20 \leq x \leq 2.10$ and $0.95 \leq y \leq 1.60$, respectively. This is because such composition allows the cathode active material of the present invention to form a crystal structure belonging to any one of triclinic space groups P1 and P1-, which are excellent in stability of the crystal structure, alkali ion diffusivity, and cycle performance as a battery. It should be noted that the ranges of x and y are more preferably set to $1.90 \leq x \leq 2.10$ and $0.95 \leq y \leq 1.05$, respectively, with a view to forming the crystal structure described above.

It should be noted that when the composition range for x or y deviates from the range set above, the substance to be manufactured by the present invention may include as a by-product NaFePO$_4$, which has one kind of maricite structure that may have an adverse effect on the structural stability or the like as described above.

In addition, the valence state of the transition metal oxide in the crystal described above is preferably divalent. When a trivalent metal ion is present, there is a risk in that a by-product such as Na$_3$M$_2$(PO$_4$)$_3$, which does not have a function as a cathode active material, is included and sodium ion conduction is inhibited. Accordingly, in the manufacturing process of the cathode active material of the present invention, it is extremely important to control the composition and control the valence through a reduction step so that the generation of the by-product is prevented.

The atmosphere in the step of melting the raw material powders is preferably a reducing atmosphere or an inert atmosphere. This is because with such atmosphere, the valence state of the transition metal oxide in the crystal described above tends to be divalent.

The reducing atmosphere is preferably achieved by supplying a reducing gas to a melting bath. As the reducing gas, it is preferred to use a mixed gas containing, in terms of vol %, 90 to 99.5% of N$_2$ and 0.5 to 10% of H$_2$, and it is more preferred to use a mixed gas containing 92 to 99% of N$_2$ and 1 to 8% of H$_2$.

The inert atmosphere is preferably achieved by supplying an inert gas to a melting bath. As the inert gas, any one of nitrogen, argon, and helium is preferably used.

The reducing gas or the inert gas may be supplied to an atmosphere above molten glass in the melting bath or supplied directly to molten glass through a bubbling nozzle. Further, these procedures may be conducted at the same time.

In addition, a cathode active material for a sodium ion secondary battery according to a second embodiment of the present invention comprises an oxide glass having a composition of the general formula Na$_x$M$_y$P$_2$O$_7$ (where M represents at least one or more kinds of transition metal elements selected from Cr, Fe, Mn, Co, and Ni, x satisfies a relationship of $1.20 \leq x \leq 2.10$, and y satisfies a relationship of $0.95 \leq y \leq 1.60$).

Herein, the oxide glass means an amorphous solid formed of an oxide. The oxide glass has features of not showing definite diffraction in powder X-ray diffraction, undergoing an endothermic phenomenon in which a solid state changes into a supercooled liquid state (also referred to as glass transition) at an arbitrary temperature, and the like.

In the manufacturing of the cathode active material according to the second aspect, the procedures in a step of blending raw materials to melt the raw materials are the same as those in the first aspect, but the obtained melt is quenched and thereby a completely homogeneous glass body (oxide glass) or oxide glass partially containing a crystal can be obtained. That is, quenching allows for formation of the oxide glass with suppressing precipitation of by-products. The cooling rate for obtaining the glass body is preferably more than 10K per second, more preferably 100K or more per second as a guide. A cooling rate of 100K or more per second can be achieved by, for example, putting the melt into contact with a cooled metal plate (for example, an iron plate) or putting the melt into water. In the case where quenching is further required, a twin-roll cooling method may be used.

Whether or not the substance obtained by the procedures described above is vitrified can be evaluated by observing the substance with a transmission electron microscope or by confirming the presence or absence of specific diffraction derived from crystals with a powder X-ray diffractometer.

The cathode active material for a sodium ion secondary battery according to suitable aspects of the present invention forms a crystal structure belonging to any one of triclinic space groups P1 and P1-. Now, FIG. 1 is a projection diagram illustrating a crystal structure of the general formula Na$_2$FeP$_2$O$_7$ belonging to the triclinic space group P1 (that is, a case in which M represents Fe and the values of x and y are x=2 and y=1, respectively, in the general formula Na$_x$M$_y$P$_2$O$_7$), from the (111) orientation. Moreover, FIG. 2 is a projection diagram illustrating a crystal structure of the general formula Na$_2$FeP$_2$O$_7$ belonging to the triclinic space group P1-, from the (100) orientation.

Figure 2:
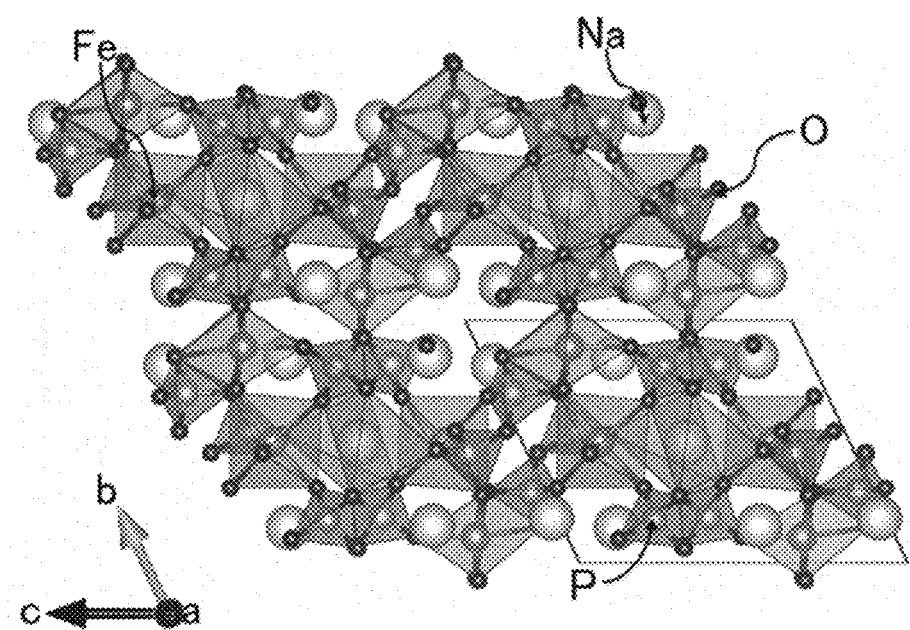
FIG. 2 is a diagram illustrating a crystal structure of a cathode active material belonging to a space group P1– according to the present invention.

It should be noted that, as illustrated in FIGS. 1 and 2, in the crystal structure belonging to the triclinic space group P1 or P1- of the present invention, a tetrahedral unit formed of PO$_4$ and an octahedral unit formed of MO$_6$ (octahedral unit formed of FeO$_6$ in FIGS. 1 and 2) form a three-dimensional network and a large tunnel in which Na ion diffusion (transfer) is expected is present in the (111) orientation for P1 and in the (100) orientation for P1-.

The transition metal element M preferably comprises Fe. When M comprises Fe, it is possible to easily form the crystal structure belonging to any one of the triclinic space groups P1 and P1- in the cathode active material.

In the case of Na$_2$FeP$_2$O$_7$ in which the transition metal element M is iron as illustrated in FIG. 1, charge proceeds according to the following reaction formula (4).

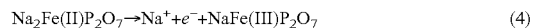

It should be noted that the discharge voltage is expected to be about 3 V, because the electromotive force of Li$_2$FeP$_2$O$_7$, which is known as a cathode active material for a lithium ion secondary battery, is in the vicinity of 3.5 V and the reduction potential of sodium (Na) is about 2.7 V, which is lower than that of lithium (Li), 3.1 V, by 0.4 V, while its crystal structure is different from that in the present invention.

Although it is difficult to make the valence state of iron to be tetravalent, it is possible to utilize a reaction of trivalent→tetravalent as shown in the formula described below by adding Mn, and thereby, an increase in cell capacity is expected. It should be noted that the upper formula (5) represents a charge reaction at the first stage and the lower formula (6) represents a charge reaction at the second stage.

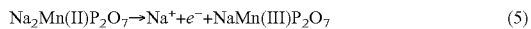
$$Na_2Mn(II)P_2O_7 \rightarrow Na^+ + e^- + NaMn(III)P_2O_7 \quad (5)$$

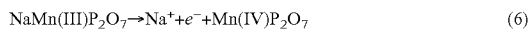
$$NaMn(III)P_2O_7 \rightarrow Na^+ + e^- + Mn(IV)P_2O_7 \quad (6)$$

It should be noted that for achieving rapid charge and discharge performance, the melt-solidified body or the oxide glass is preferably finely pulverized so that the resultant powder has an average grain size of about from 50 nm to 50 μm. This is because the fine pulverization of the powder allows for a shorter diffusion distance of a sodium ion in the active material. It should be noted that the fine pulverization of the powder can be achieved by pulverizing the melt-solidified body or the oxide glass. It should be noted that the average grain size is preferably from 0.7 to 5 μm, more preferably from 1 to 4 μm. When the average grain size of the cathode active material is too large, the sodium ion present in the active material cannot be stored and released effectively during charge and discharge, and therefore, the discharge capacity tends to be decreased. In contrast, when the average grain size of the cathode active material is too small, the sodium ion is liable to be eluted, and therefore, the discharge capacity tends to be decreased.

It should be noted that in the present invention, the average grain size refers to a value calculated from an observed image of the cathode with an electron microscope. Specifically, 20 pieces of cathode active material grains are randomly selected in an electron microscope image, and the value is calculated as the average value of the grain sizes of the grains. It should be noted that in the case of a flattened grain, the average value of the longer diameter and the shorter diameter is taken as the grain size.

Further, in the cathode active material for a sodium ion secondary battery of the present invention, the surface of the cathode active material is coated with electro conductive carbon. The thickness of the electro conductive carbon for the coating is preferably from 1 nm to 100 nm (more preferably from 5 nm to 80 nm). This is because of the following reasons. When the thickness of the electro conductive carbon is less than 1 nm, the coating is likely to disappear in the use of the battery and the cell performance may deteriorate. When the thickness of the electro conductive carbon exceeds 100 nm, while the conductivity is improved, the cell capacity may be decreased or an adverse effect may be exhibited on voltage depression or the like. It should be noted that, by adding a carbon source (organic compound) described below prior to sintering the melt-solidified body or the oxide glass, the substance after the sintering is coated with the electro conductive carbon.

The raw material for the electro conductive carbon may be any raw material as long as it is an organic compound including a carbon source that reacts with the melt-solidified body or the oxide glass in the course of the heat treatment and remaining as carbon. In particular, glucose, citric acid, ascorbic acid, a phenol resin, a surfactant, or the like, which acts also as a reducing agent for the transition metal, is preferably used. The organic compound is preferably added in an amount required not only to achieve the thickness of the coating described above but also to effectively exhibit the action as a reducing agent. For example, in the case of using iron as the transition metal, the organic compound is preferably added in an amount required to change the valence of iron in the oxide glass or the melt-solidified body from 3 to 2.

It should be noted that the added amount of the carbon source is preferably from 1 to 20 parts by mass, in consideration that the glass grain surface is coated with the carbon source and the valence state of the transition metal (for example, iron) in the grain is reduced to +2, and of the volume fraction of the finally remaining electro conductive carbon as well. If should be noted that when the added amount is less than 1 part by mass, there is a risk in that the reduction does not proceed sufficiently and the intended crystal is not obtained. In contrast, when the added amount exceeds 20 parts by mass, while the reduction and the crystallization proceed, the remaining electro conductive carbon becomes excessive, which may bring about a decrease in capacity of the cathode active material.

The method of manufacturing a cathode active material for a sodium ion secondary battery of the present invention preferably further comprises a crystallization step of crystallizing through heat treatment the powder obtained through the pulverization step without the addition step. This enables suppression of a decrease in sodium ion conductivity at an interface between the cathode active material and an electrolyte.

When the melt-solidified body or the oxide glass is heated (sintered) at the glass transition temperature or more, a crystal of the general formula $Na_xM_yP_2O_7$ belonging to the triclinic space group P1 or P1− can be formed. Further, in the course of the crystallization, the heat treatment is preferably performed at relatively low temperature near the glass transition temperature for a long period of time. With this, crystallized glass (that is, a complex of glass and a crystal) having a small crystalline size can be formed.

Now, $Na_2FeP_2O_7$ is taken as an example. As described later, it is confirmed that its glass transition temperature is 451° C. and the crystallization peak temperature is around 580° C. Accordingly, in the case of this composition, the sintering temperature is set to preferably from 451° C. to 690° C., more preferably from 500° C. to 650° C.

Further, after the heat treatment at low temperature for a long period of time, it is possible to increase the volume fraction of the precipitated crystal (for example, a crystal of $Na_2FeP_2O_7$) by performing heat treatment at an arbitrary temperature lower than the liquidus temperature of the crystal. It should be noted that, as described above, the size and volume fraction of the grain can be freely controlled by appropriately adjusting the conditions of the heat treatment in the course of the crystallization of glass.

EXAMPLES

Hereinafter, the present invention is described in detail by way of Examples. The present invention is by no means limited to Examples.

Example 1: Production of Composite Oxide Glass

First, 3.73 g of sodium carbonate ($Na_2CO_3$), 2.82 g of ferric oxide ($Fe_2O_3$), and 6.90 g of orthophosphoric acid ($H_3PO_4$) were weighed and mixed so that the solidified body after melting had a weight of 10 g and a composition of $Na_2FeP_2O_7$. It should be noted that, in Example 1, the mixing ratio of the raw material compounds corresponds to the mixing ratio of cations (positive ions) in the melt-solidified body to be produced, that is, Na:Fe:P=2:1:2. Next, all the mixture obtained was dried at 300° C. for about 3 hours. After that, the mixture was melted in an electric furnace at 1,200° C. for 10 minutes in the atmosphere. Then, the obtained melt was put into 5 liters of water (temperature:

20° C.) and cooled to produce a solidified body (oxide glass). The cooling rate in this case corresponds to 1,000 K/s.

In addition, solidified bodies (oxide glass) having compositions (component ratio) of $Na_{1.89}Fe_{1.056}P_2O_7$, $Na_{1.78}Fe_{1.11}P_2O_7$, $Na_{1.67}Fe_{1.165}P_2O_7$, $Na_{1.56}Fe_{1.22}P_2O_7$, $Na_{1.65}Fe_{1.28}P_2O_7$, $Na_{1.45}Fe_{1.28}P_2O_7$, and $Na_{1.34}Fe_{1.33}P_2O_7$, which were different from the composition described above in Example 1, were able to be produced by the same method (mixing of raw materials, melting, and cooling) as in Example 1. For the total eight kinds of glass bodies produced, see Table 1 described later.

Example 2: Crystallization of Oxide Glass

Figure 3:
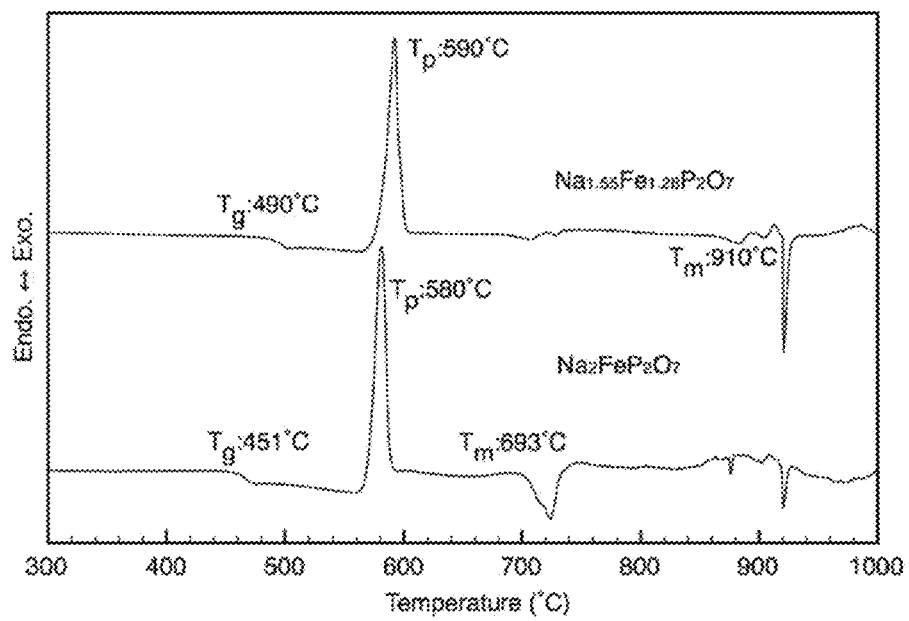
FIG. 3 is a graph showing results of differential thermal analysis for a cathode active material (oxide glass) according to Example 2.

The glass body (oxide glass) obtained in Example 1 was finely pulverized to obtain a grain having a grain size of 20 μm. After that, 10 mg of the resultant glass body were subjected to differential thermal analysis. FIG. 3 shows differential thermal curves for the glass body having the composition described above. As shown in FIG. 3, if was confirmed that the sample having the composition of $Na_2FeP_2O_7$ had a glass transition temperature at 451° C., a crystallization peak around 580° C., and a melting temperature of crystal around 693° C. In contrast, it was confirmed that the sample having the composition of $Na_{1.55}Fe_{1.28}P_2O_7$ described above had a glass transition temperature at 490° C., a crystallization peak around 590° C., and a melting temperature of crystal around 910° C. It should be noted that Table 1 shows the compositions, glass transition temperatures, crystallization peak temperatures, and melting temperatures of crystal for the eight kinds of glass bodies produced as above.

$Na_2FeP_2O_7$ having a structure belonging to the triclinic space group P1- is shown as the third pattern and a simulation pattern for $Na_2FeP_2O_7$ having a structure belonging to the triclinic space group P1 is shown as the bottom pattern.

Figure 4:
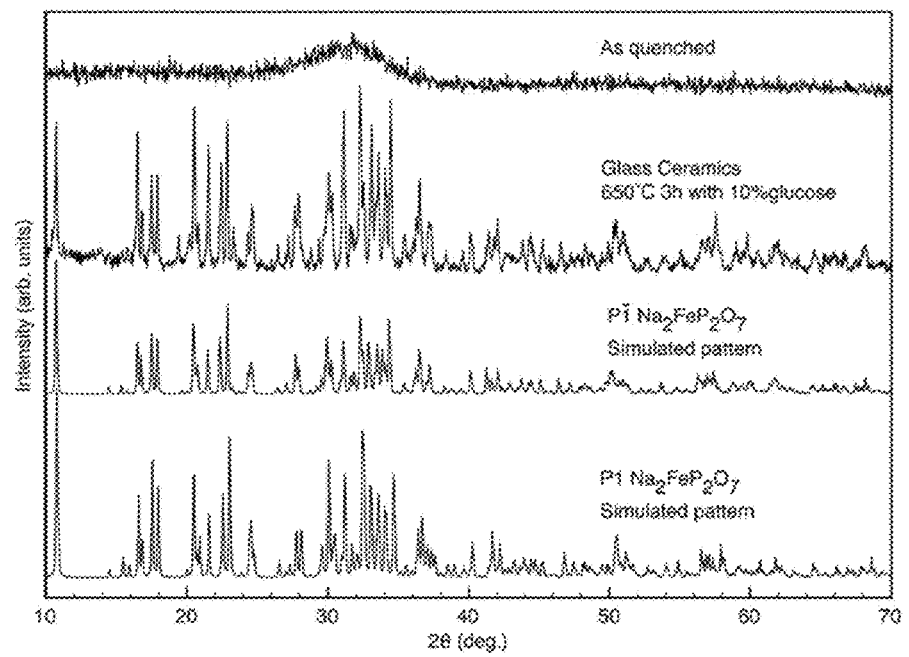
FIG. 4 is a graph showing results of powder X-ray diffraction measurement and results of simulation based on Rietveld refinement according to Example 2.

As shown in the top pattern in FIG. 4, specific diffraction was not observed for the sample not subjected to crystallization. In contrast, as shown in the second pattern in FIG. 4, a plurality of diffractions specific to crystalline phase were observed for the sample subjected to crystallization. In addition, Rietveld refinement of the second diffraction pattern revealed that the sample had a structure of $Na_2FeP_2O_7$ having a structure belonging to any one of triclinic space groups P1 and P1-, as shown in the third and bottom patterns in FIG. 4. Lattice parameters determined by the refinement are as follows: a=0.970366 nm, b=1.098223 nm, c=1.232840 nm, α=148.7183°, β=121.7777°, and γ=68.2710° when the space group is supposed to be P1; and a=0.64061 nm, b=0.938893 nm, c=1.09716 nm, α=64.5381°, β=86.0580°, and γ=73.0619° when the space group is supposed to be P1-.

Example 4: Evaluation as Cathode Active Material

The charge and discharge performance of the crystallized glass powder having the composition of $Na_2FeP_2O_7$ obtained in Example 3 were evaluated. Specifically, 10 wt % of carbon black and 5 wt % of polyvinylidene fluoride were added to 85 wt % of the crystallized glass powder and mixed in a mortar. Next, N-methyl-2-pyrrolidinone was added thereto as a solvent to prepare slurry. Then, the obtained slurry was applied onto an aluminum foil, the solvent was dried, and the obtained electrode was cut into 15 mmφ.

TABLE 1

| Glass body produced | No. 1 | No. 2 | No. 3 | No. 4 | No. 5 | No. 6 | No. 7 | No. 8 |
|---|---|---|---|---|---|---|---|---|
| x value for $Na_x$ | 2 | 1.89 | 1.78 | 1.67 | 1.56 | 1.55 | 1.45 | 1.34 |
| y value for $Fe_y$ | 1 | 1.065 | 1.11 | 1.165 | 1.22 | 1.28 | 1.28 | 1.33 |
| Glass transition temperature (° C.) | 451 | 455 | 467 | 476 | 485 | 490 | 495 | 495 |
| crystallization Peak temperature (° C.) | 580 | 580 | 585 | 587 | 590 | 590 | 595 | 605 |
| Melting temperature of crystal (° C.) | 693 | 910 | 910 | 910 | 910 | 910 | 918 | 915 |

(Pulverization Step, Addition Step of Organic Compound, and Sintering Step in Example 2)

For the sample having the composition of $Na_2FeP_2O_7$, the glass body (sample) was finely pulverized with a ball mill to obtain a grain having a grain size of 20 μm. 10 wt % of ascorbic acid was added to the resultant grain and then mixed. After that, heating (sintering) was performed under the conditions of 650° C. in a 5% hydrogen-95% argon atmosphere for 3 hours. Thus, crystallized glass powder was obtained.

Example 3: Identification of Crystalline Phase

Powder X-ray diffraction measurement was performed on the glass powder and crystallized glass powder having the composition of $Na_2FeP_2O_7$ produced in Example 2. Now, the powder X-ray diffraction pattern of the former glass powder is shown in FIG. 4 as the top pattern. In contrast, the powder X-ray diffraction pattern of the latter crystallized glass powder is shown in FIG. 4 as the second pattern. It should be noted that, in FIG. 4, a simulation pattern for Next, the resultant was compressed at a pressure of 600 kgf/cm² to obtain a cathode mix. Next, a test cell according to Example 4 was produced by using the obtained cathode mix, an electrolyte (EC:DEC solution of $NaPF_6$ (1 mol/L)), and a sodium foil as an anode.

Figure 5:
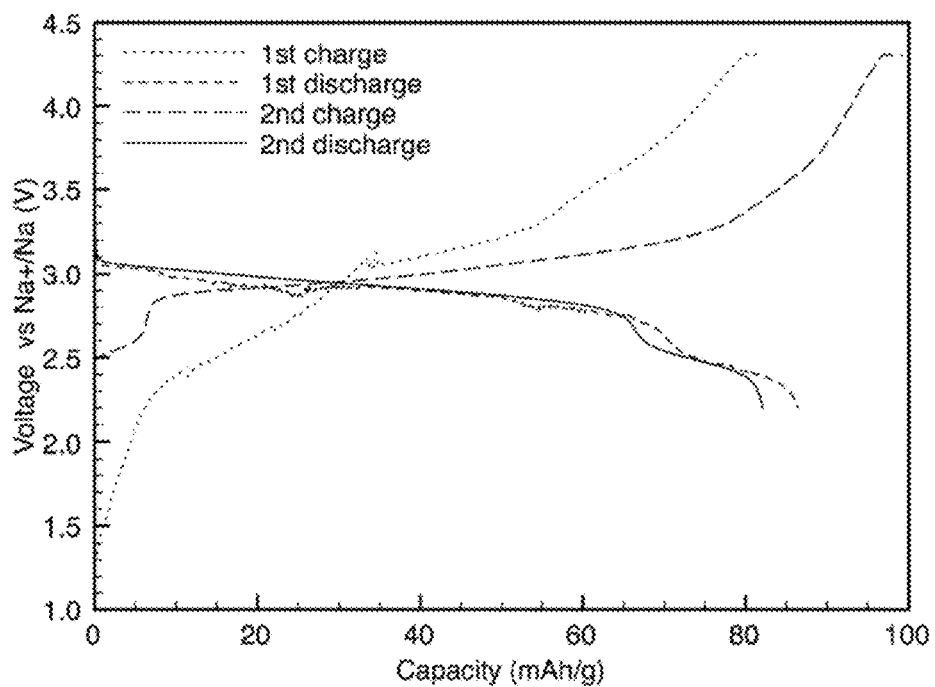
FIG. 5 is a graph showing charge and discharge performance of a test cell (sodium ion secondary battery) according to Example 4.

FIG. 5 shows the results of conducting charge and discharge at a constant current of 30 μA/second on the test cell according to Example 4 produced as above. More specifically, FIG. 5 is a graph showing charge and discharge curves in the first and second cycles in the case of using the crystal of $Na_2FeP_2O_7$ as a cathode active material, using as a cathode mix a sample prepared by mixing 85 wt % of the cathode active material, 10 wt % of carbon black, and 5 wt % of polyvinylidene fluoride, using metal sodium as an anode, and setting cut-off voltages to from 2 V to 4.3 V.

At the time of charge, a plateau potential associated with iron in equilibrium between its divalent and trivalent forms was observed in the vicinity of a voltage of 2.9 V as shown in FIG. 5. The discharge capacity in the first cycle was 86 mAh/g.

Figure 6:
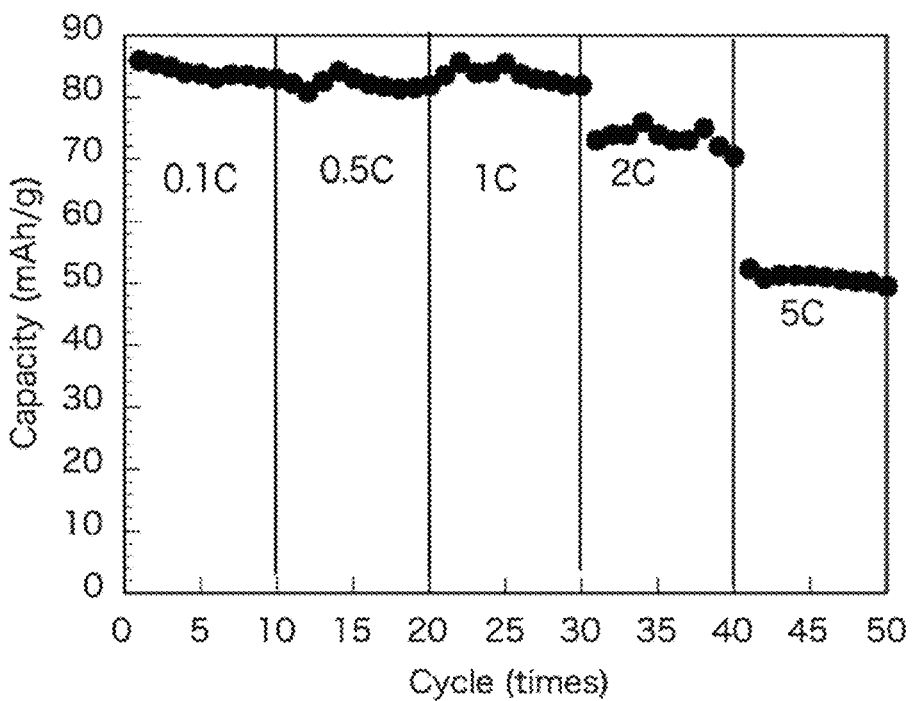
FIG. 6 is a graph showing cycle number dependency of discharge capacity of a test cell according to Example 5.

Example 5: Evaluation of Cycle Number Dependency of Discharge Capacity of Cathode Active Material FIG. 6 shows the cycle number dependency of discharge capacity of a test cell produced through the same steps as those in Example 4. The cycle number dependency of discharge capacity was obtained by repeating charge and discharge 10 times from the first cycle at a constant current corresponding to a current that brings about full discharge in 10 hours based on the theoretical capacity of 97 mAh/g (represented as 0.1 C), and subsequently repeating charge and discharge 10 times at each of 0.5 C, 1 C, 2 C, and 5 C. It should be noted that 5 C means a value that requires 12 minutes for fully discharging the theoretical capacity of 97 mAh/g.

As shown in FIG. 6, the discharge capacity was constant in the range of about from 80 to 86 mAh/g at from 0.1 C to 1 C. While the capacity decreased with a higher discharge rate, the capacity at 5 C was 50 mAh/g, which was about half of the theoretical capacity.

Example 6: Evaluation as Cathode Active Material

Figure 7:
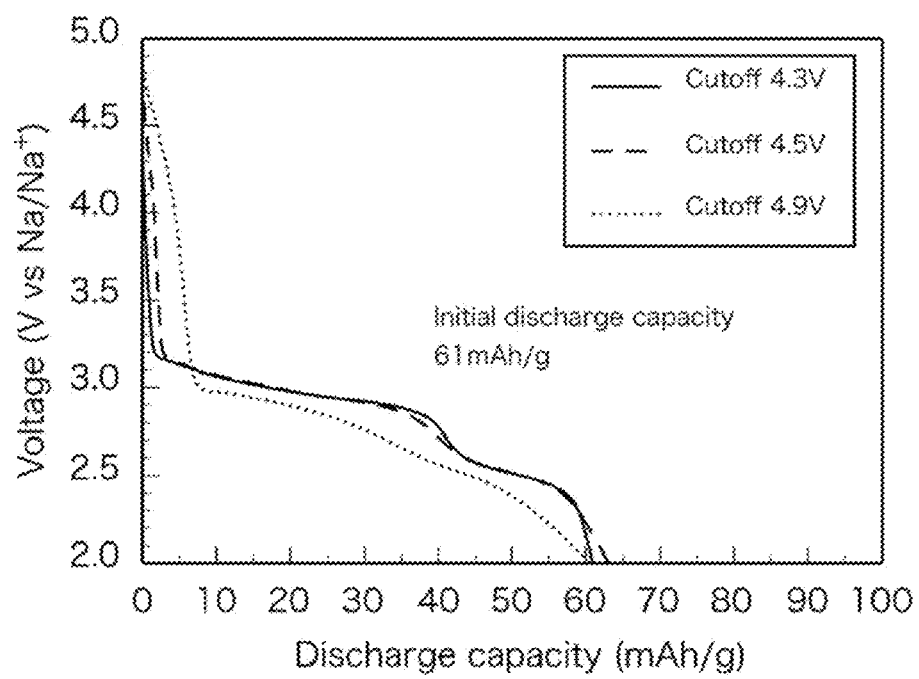
FIG. 7 is a graph showing discharge curves of a test cell according to Example 6 at respective cycles in the case of repeating charge and discharge.

FIG. 7 shows discharge curves for a test cell produced by the same method as those in Examples 1 to 4 except that the composition was $Na_2Mn_{0.5}Fe_{0.5}P_2O_7$. The discharge curve in each cycle obtained by setting the charge and discharge rate to 0.1 C (constant) and setting the cut-off voltages in charge and discharge cycles to from 2.0 V to 4.3 V in the first cycle, to from 2.0 V to 4.5 V in the second cycle, and to from 2.0 V to 4.9 V in the third cycle is shown. The discharge capacity was about 61 mAh/g in all the three cycles. While the discharge capacity was lower than the result for $Na_2FeP_2O_7$ in Example 1, a shoulder resulting from oxidation-reduction of $Mn^{2+}/Mn^{3+}$ was confirmed in the vicinity of 4 V by increasing the cut-off voltage. It was confirmed that high potential of the cell was able to be achieved by replacing a part of iron (Fe) with another transition metal.

Example 7

Sodium carbonate, iron oxalate, sodium metaphosphate, and orthophosphoric acid were mixed so that the composition became $Na_2FeP_2O_7$ ($Na_2O$=33.3 mol %, FeO=33.3 mol %, and $P_2O_5$=33.3 mol %).

The mixture was melted at 1,250° C. in a $N_2$ atmosphere in a quarts crucible for 45 minutes. The resultant melt was put in a two-direction rollout forming machine to obtain a film-like melt-solidified body.

The melt-solidified body was pulverized with a ball mill and classified with air to obtain powder having an average grain size of 2 μm.

The obtained powder was sintered at 620° C. in a atmosphere for 3 hours and then crushed to obtain a cathode active material.

Further, by utilizing the cathode active material, a test cell according to Example 7 was produced through the same steps as those in Example 4.

Figure 8:
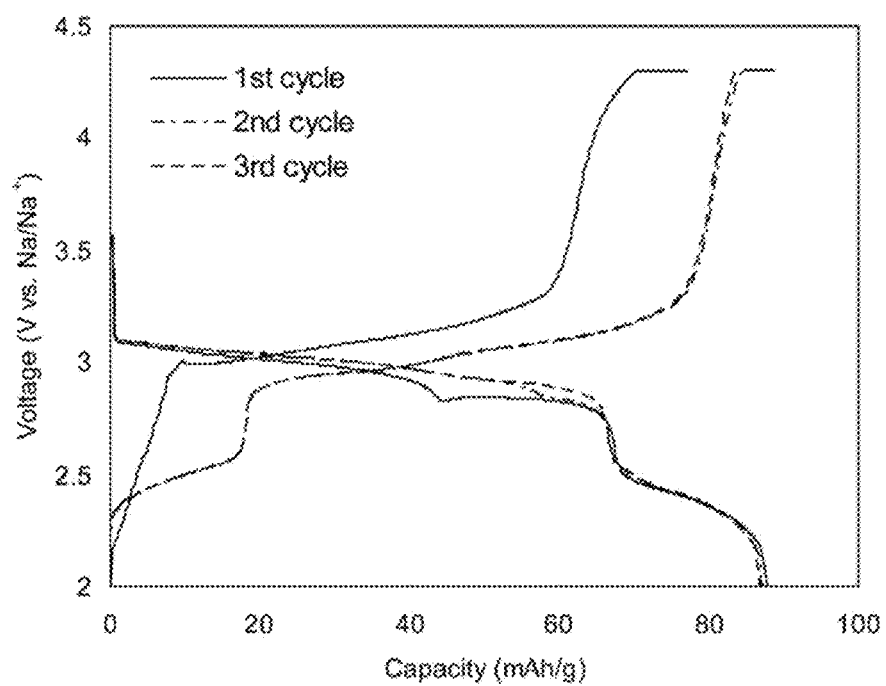
FIG. 8 is a graph showing discharge curves of a test cell according to Example 7 in the case of repeating charge and discharge.

FIG. 8 shows charge and discharge curves for the test cell according to Example 7. The charge capacity and discharge capacity in the first cycle were 77 mAh/g and 88 mAh/g, respectively. The capacities were both satisfactory.

The invention claimed is:

1. A cathode active material for a sodium ion secondary battery, comprising a crystalline substance represented by the formula $Na_xM_yP_2O_7$, where M is at least one transition metal element selected from the group consisting of Cr, Fe, Mn, and Ni, x satisfies a relationship of 1.20≤x≤2.10, and y satisfies a relationship of 0.95≤y≤1.60, and wherein the crystalline substance forms a crystal structure belonging to any one of triclinic space groups P1 and P1− and has an average grain size of from 0.7 μm to 50 μm.

2. The cathode active material for a sodium ion secondary battery according to claim 1, wherein the transition metal element M is Fe.

3. The cathode active material for a sodium ion secondary battery according to claim 1, further comprising conductive carbon for coating a surface thereof, the carbon for coating having a thickness of from 1 nm to 100 nm.

4. The cathode active material for a sodium ion secondary battery according to claim 1, wherein the cathode active material is formed of powder having an average grain size of from 1 μm to 50 μm.

5. A method of manufacturing a cathode active material for a sodium ion secondary battery comprising a crystalline substance represented by the formula $Na_xM_yP_2O_7$, where M is at least one transition metal element selected from the group consisting of Cr, Fe, Mn, and Ni, x satisfies a relationship of 1.20≤x≤2.10, and y satisfies a relationship of 0.95≤y≤1.60, and wherein the crystalline substance forms a crystal structure belonging to any one of triclinic space groups P1 and P1− and has an average grain size of from 0.7 μm to 50 μm, the method comprising the steps of:
blending raw material powders comprising (1) sodium raw material and phosphate raw material, or a composite oxide of the sodium raw material and the phosphate raw material, and (2) a raw material comprising a transition metal compound comprising the transition metal element M,
melting the raw material powders at a temperature equal to or higher than a temperature at which the transition metal compound forms a liquid phase; and
cooling the melt to obtain a melt-solidified body.

6. The method of manufacturing a cathode active material for a sodium ion secondary battery according to claim 5, wherein the transition metal element M is Fe.

7. The method of manufacturing a cathode active material for a sodium ion secondary battery according to claim 5, wherein melting the raw material powders is in a reducing atmosphere or an inert atmosphere.

8. The method of manufacturing a cathode active material for a sodium ion secondary battery according to claim 5, wherein the melt-solidified body is an oxide glass.

9. The method of manufacturing a cathode active material for a sodium ion secondary battery according to claim 5, further comprising pulverizing the melt-solidified body to obtain a powder.

10. The method of manufacturing a cathode active material for a sodium ion secondary battery according to claim 9, further comprising crystallizing the powder through a heat treatment in an inert atmosphere or a reducing atmosphere.

11. The method of manufacturing a cathode active material for a sodium ion secondary battery according to claim 10, wherein crystallizing the powder forms a crystal structure belonging to any one of triclinic space groups P1 and P1−.

12. The method of manufacturing a cathode active material for a sodium ion secondary battery according to claim 9, the method further comprising:
adding a carbon source to the powder; and
crystallizing the powder to which the carbon source is added through a heat treatment in an inert atmosphere or a reducing atmosphere.

13. The method of manufacturing a cathode active material for a sodium ion secondary battery according to claim 12, wherein the carbon source is added in an amount of from 1 to 20 parts by mass.

14. The method of manufacturing a cathode active material for a sodium ion secondary battery according to claim 12, wherein crystallizing the powder forms a crystal structure belonging to any one of triclinic space groups P1 and P1-.

* * * * *